US011556560B2

(12) United States Patent
Qi et al.

(10) Patent No.: US 11,556,560 B2
(45) Date of Patent: Jan. 17, 2023

(54) INTELLIGENT MANAGEMENT OF A SYNCHRONIZATION INTERVAL FOR DATA OF AN APPLICATION OR SERVICE

(71) Applicant: Microsoft Technology Licensing, LLC, Redmond, WA (US)

(72) Inventors: Shuyao Qi, Redmond, WA (US); Jakob Anders Moberg, Seattle, WA (US); Hagar Emma Moshe, Bellevue, WA (US); Gary Lee Neitzke, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 266 days.

(21) Appl. No.: 16/832,967

(22) Filed: Mar. 27, 2020

(65) Prior Publication Data

US 2021/0232596 A1 Jul. 29, 2021

Related U.S. Application Data

(60) Provisional application No. 62/965,463, filed on Jan. 24, 2020.

(51) Int. Cl.
*G06F 7/00* (2006.01)
*G06F 16/27* (2019.01)
(Continued)

(52) U.S. Cl.
CPC .............. *G06F 16/27* (2019.01); *G06N 5/04* (2013.01); *G06N 20/00* (2019.01)

(58) Field of Classification Search
CPC .. G06F 16/27; G06F 16/221; G06F 16/24573; G06F 16/215; G06F 16/907;
(Continued)

(56) References Cited

U.S. PATENT DOCUMENTS 9,477,678 B2 10/2016 Lin et al.
9,990,372 B2 6/2018 Lin et al.
(Continued)

FOREIGN PATENT DOCUMENTS

WO 2014153374 A2 9/2014

OTHER PUBLICATIONS

Hendrickson, et al., "Overview of co-authoring in SharePoint Server", Retrieved from: https//docs.microsoft.com/en-us/sharepoint/governance/co-authoring-overview, Mar. 7, 2018, 5 Pages.
(Continued)

*Primary Examiner* — Mohammad A Sana

(57) ABSTRACT

The present disclosure relates to processing operations configured for intelligent management of a synchronization interval usable to synchronize data for an application/service between local data storage and distributed data storage. A classification prediction for a synchronization interval may be generated that is used as prediction for modifying the synchronization interval when a plurality of computing devices, linked to one or more user accounts, are used to access content. For instance, a suggestion is made as to whether a synchronization interval should be made faster, slower or even remain unchanged when a user account is accessing content. This may occur based on analysis of contextual factors described herein, thereby enabling a synchronization prediction component to make a best possible prediction for setting a synchronization interval. Artificial intelligence processing may be trained to generate the classification prediction for a synchronization interval. The classification prediction is utilized to manage modification of synchronization interval.

18 Claims, 6 Drawing Sheets

(51) Int. Cl.
*G06N 5/04* (2006.01)
*G06N 20/00* (2019.01)

(58) Field of Classification Search
CPC ............ G06N 20/00; G06N 5/04; G06N 3/08;
G06Q 30/06; G06Q 30/0269; G06Q
30/0623; G06Q 30/0201; G06Q 30/02;
G06Q 30/0185
See application file for complete search history.

(56) References Cited

U.S. PATENT DOCUMENTS

| | | | |
|---|---|---|---|
| 2010/0318647 A1* | 12/2010 | Savoor | H04L 12/14 709/224 |
| 2013/0191451 A1 | 7/2013 | Tse et al. | |
| 2013/0326323 A1 | 12/2013 | Siwoff et al. | |
| 2014/0289428 A1 | 9/2014 | Walter et al. | |
| 2015/0347552 A1 | 12/2015 | Habouzit et al. | |
| 2016/0306864 A1* | 10/2016 | Estes, Jr. | G06F 16/27 |
| 2017/0140285 A1 | 5/2017 | Dotan-cohen et al. | |
| 2018/0081503 A1* | 3/2018 | Green | G06N 3/084 |
| 2019/0073407 A1 | 3/2019 | Mandavilli et al. | |
| 2019/0213557 A1* | 7/2019 | Dotan-Cohen | G06Q 10/1093 |
| 2019/0332710 A1 | 10/2019 | Wei et al. | |
| 2020/0403817 A1* | 12/2020 | Daredia | H04L 12/1822 |
| 2021/0074419 A1* | 3/2021 | McCrea | H04H 60/31 |

OTHER PUBLICATIONS

Neil, Fraser, "Differential Synchronization", In Proceedings of the 9th ACM symposium on Document engineering, Sep. 16, 2009, 8 Pages.

"International Search Report and Written Opinion Issued in PCT Application No. PCT/US20/066742", dated Mar. 29, 2021, 17 Pages.

* cited by examiner

200

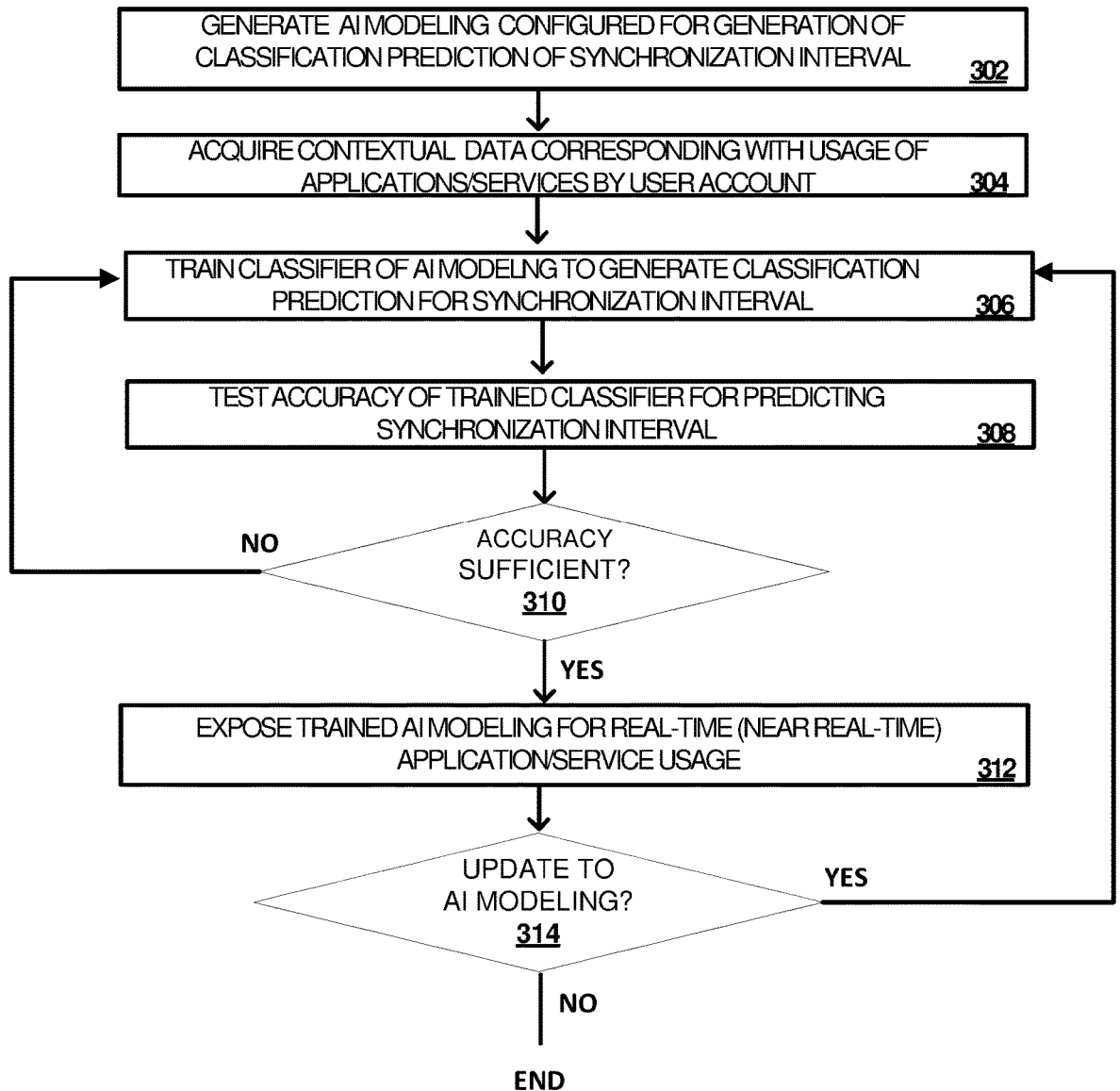

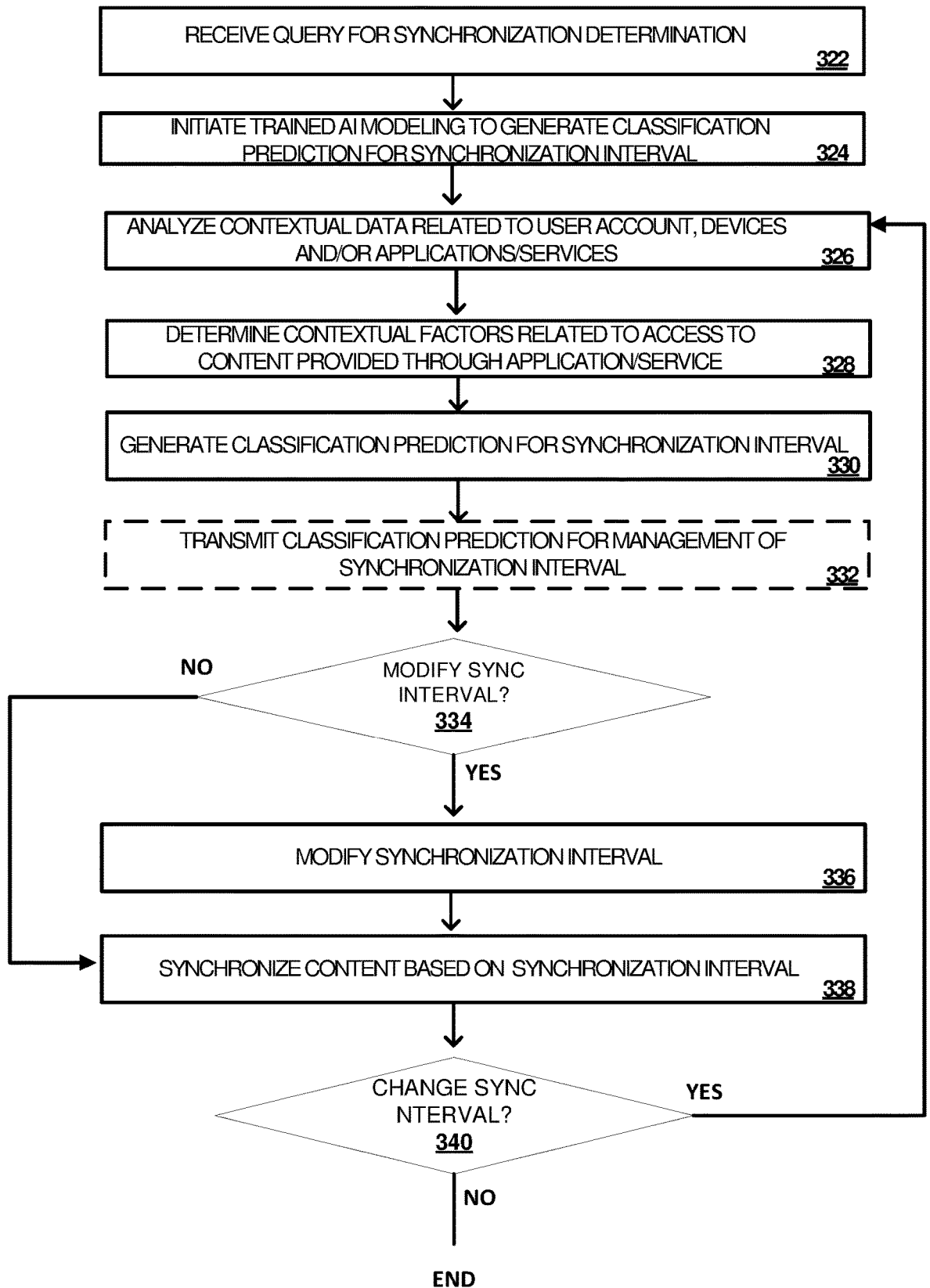

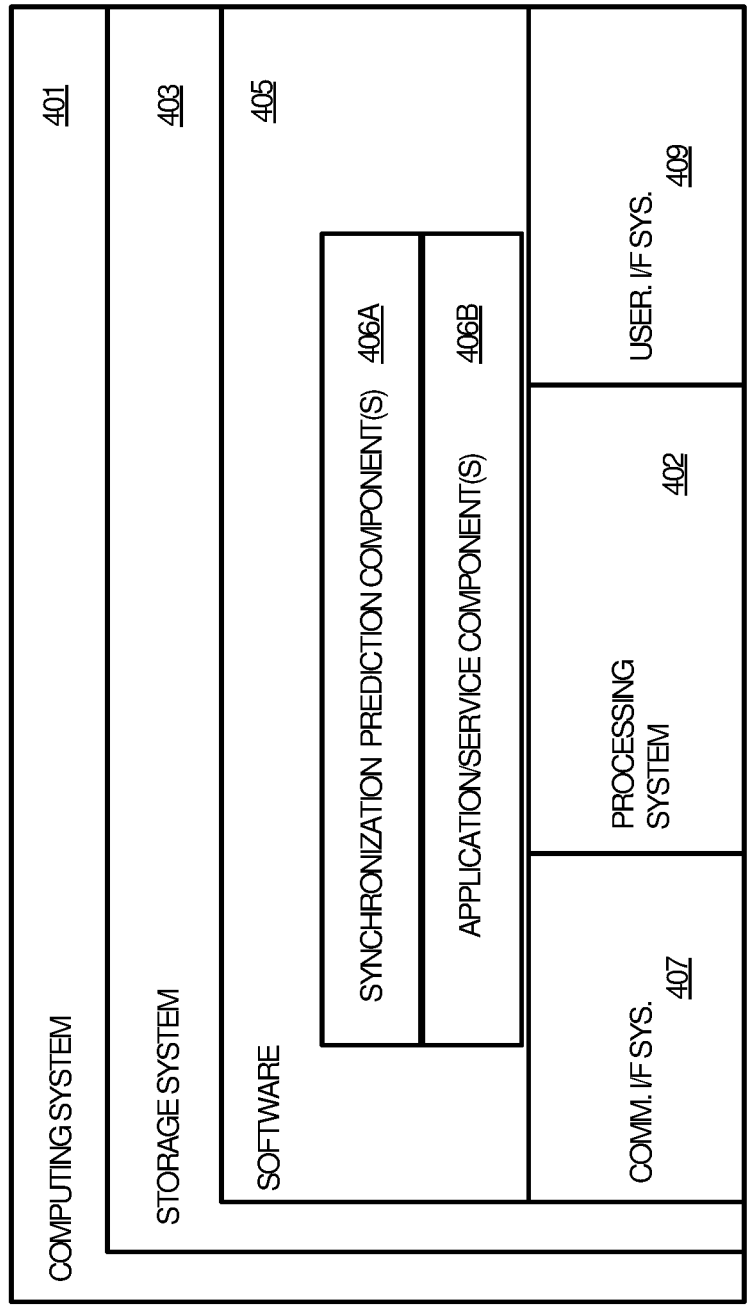

INTELLIGENT MANAGEMENT OF A SYNCHRONIZATION INTERVAL FOR DATA OF AN APPLICATION OR SERVICE

CROSS-REFERENCE TO RELATED APPLICATIONS

This application claims priority to U.S. Provisional Patent Application No. 62/965,463, entitled "INTELLIGENT MANAGEMENT OF A SYNCHRONIZATION INTERVAL FOR DATA OF AN APPLICATION OR SERVICE", filed on Jan. 24, 2020, which is incorporated by reference herein in its entirety.

BACKGROUND

Currently, most applications/services sync user changes based on a fixed interval when the files are not actively collaborated on. However, a fixed synchronization interval is not the most efficient way to manage computing resources specifically when it can be identified that content is not frequently accessed. For instance, portions of content may not need to be synchronized each time an electronic document is accessed in cases where a content portion is not being edited or metadata otherwise modified. When unnecessary synchronization occurs, this creates an additional processing load on computing resources both client-side and server-side, increases latency in synchronization processing as well as represents inefficient management of a synchronization interval. When organizations manage a large amount of data, computing resources (e.g., server farms) can be greatly affected by the inefficient management.

In many technical instances, a synchronization interval is set to repeatedly backup content at a fast interval to minimize the chance that data is lost. When users are collaboratively accessing electronic content, a fast synchronization interval may be required due to the high likelihood that multiple users may access electronic content at any given time. However, that fast synchronization interval may not be required in instances where a single user account is accessing content. From a processing efficiency standpoint, it may not be beneficial to continuously adjust a synchronization interval at a fast rate when content is being accessed by a single user account because extra computing resources are tied up when they may not need to be, among other technical drawbacks.

Furthermore, another technical challenge is predicting when a user may next access electronic content is quite difficult. If a synchronization interval is not timely, there is a risk of data loss as well as creation of a poor user experience. Traditionally, there are no systems methods in place for management of a synchronization interval nor any systems or methods that attempt to correlate a prediction on user access with management of a synchronization interval.

SUMMARY

In view of the foregoing technical challenges, the present disclosure relates to processing operations configured for intelligent management of a synchronization interval. A synchronization interval may be used to synchronize data for an application/service between local data storage and distributed data storage. In examples described herein, a classification prediction for a synchronization interval may be generated that is used as prediction for modifying a synchronization interval. Processing described herein pertains to setting of a synchronization interval when access is made to content, for example, through client devices associated with a user account. This may differentiate from technical examples where a synchronization interval is set for concurrent collaborative access by a plurality of user accounts, which may consistently require a fast synchronization interval to mitigate the risk of data loss during concurrent collaborative access. In technical instances where concurrent collaborative access is detected, a synchronization interval may be automatically set to a fastest possible synchronization interval.

The present disclosure generates a synchronization interval classification prediction, which is a suggestion as to whether a synchronization interval should be made faster, slower or even remain unchanged for synchronizing content during user-access to content provided through an application/service. The synchronization interval classification prediction may be generated based on results of contextual evaluation of user-account access to specific content. A variety of contextual factors as described herein may be evaluated to generate a synchronization interval classification prediction, thereby enabling a synchronization prediction component to make a best possible prediction for setting a synchronization interval. In some examples, artificial intelligence (AI) processing may be trained to generate the classification prediction for a synchronization interval. This provides a sustainable and adaptable technical solution for managing a synchronization interval as context changes over time. The classification prediction may then be utilized for modification of a synchronization interval, thereby providing efficient management of computing resources during execution of an exemplary application/service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 3A illustrates an exemplary method for generating and training artificial intelligence modeling configured to generate a synchronization interval classification prediction, with which aspects of the present disclosure may be practiced.

FIG. 3B illustrates an exemplary method for managing a synchronization interval based on generation of synchronization interval classification predictions, with which aspects of the present disclosure may be practiced.

FIG. 4 illustrates a computing system suitable for implementing processing operations described herein related to management of a synchronization interval for synchronization of content between a client device and a distributed data storage, with which aspects of the present disclosure may be practiced.

DETAILED DESCRIPTION

Figure 1A:
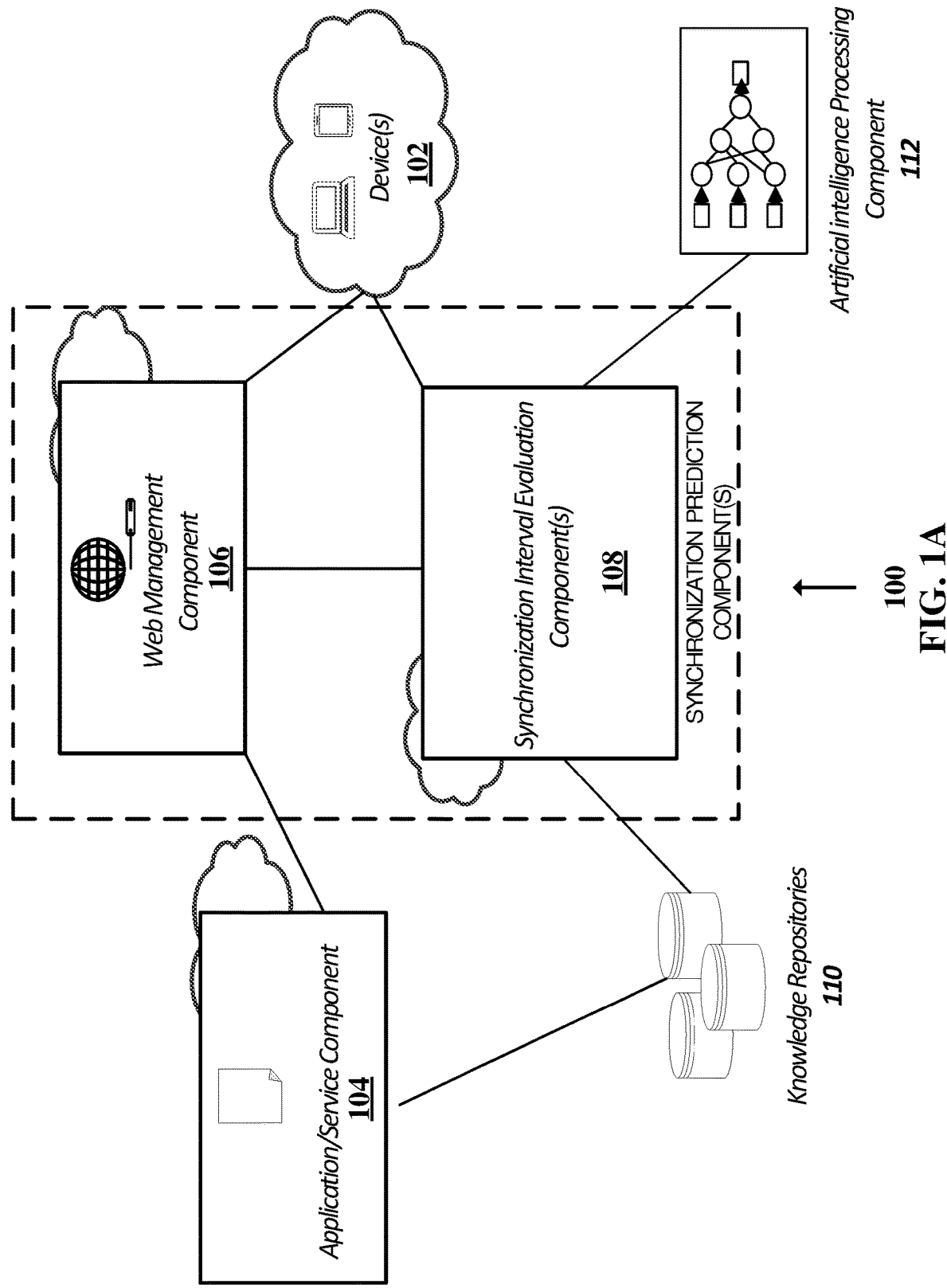
FIG. 1A illustrates an exemplary system diagram providing an interaction between components that are configured for management of a synchronization interval as described herein, with which aspects of the present disclosure may be practiced.

The present disclosure relates to processing operations configured for intelligent management of a synchronization interval. A synchronization interval may be used to synchronize data for an application/service between local data storage and distributed data storage. For instance, data of an electronic document of an application/service may be locally stored (e.g., local cache of a client computing device) and synchronized with a distributed data storage. The distributed data storage may be utilized by an application/service utilizes to maintain current versions of electronic documents provided when a user accesses electronic content, either individually or collaboratively. As referenced in the foregoing, processing described herein pertains to setting of a synchronization interval when access is made to content through a user account. This may differentiate from technical examples where a synchronization interval is set for concurrent collaborative access by a plurality of user accounts, which may consistently require a fast synchronization interval to mitigate the risk of data loss during concurrent collaborative access. In technical instances where concurrent collaborative access is detected, a synchronization interval may be automatically set to a fastest possible synchronization interval.

The synchronization interval as described herein may be set specifically to synchronize a specific content portion (e.g., within an electronic document or grouping of electronic documents), an entirety of an electronic document or a grouping of content that comprises a plurality of electronic documents, among other examples. The synchronization of content, via the synchronization interval, may further be set relative to a specific user account or alternatively a plurality of user accounts, for example, in technical scenarios where a single user account is detected as accessing a content portion at one time. As such, a synchronization interval may be customizable in different ways to maximize computing efficiency and minimize the risk of data loss across various user access situations based on contextual analysis. In one non-limiting example, a synchronization interval may be set to synchronize one content portion of an electronic document at a different timing rate as compared with another content portion, where analysis of signal data, including user-specific usage data, may enable accurate predictions regarding when to synchronize content. For instance, analysis of historical device usage data may yield a determination as to whether a user account utilizes two or more of its client devices, linked to the user account, to access content over a predetermined time period. This may be an indicator that a synchronization interval should be set to occur more frequently as it is highly likely that data will need to be synchronized across different user devices in the near future. In other non-limiting examples, synchronization intervals may be set to manage a synchronization state of a specific user account or a group of user accounts. In any such technical example, an application or service can execute much more efficiently if it has to synchronize only a portion of an electronic document at a fast rate as opposed to having to synchronize an entire electronic document at that same fast rate.

As referenced in the foregoing, a synchronization interval classification prediction is generated which provides a suggestion to an application/service as to whether a synchronization interval should be made faster, slower or even remain unchanged, when synchronizing content during user-access to the content. The synchronization interval classification prediction may be generated based on results of contextual evaluation of user-account access to specific content. This may comprise an evaluation of access to content (prior and/or current) by a specific user account as well as technical examples where access by a user account is comparatively evaluated relative to that by other user accounts. A variety of contextual factors as described herein may be evaluated to generate a synchronization interval classification prediction, thereby enabling a synchronization prediction component to make a best possible prediction for setting a synchronization interval. In some examples, artificial intelligence (AI) processing may be trained to generate the classification prediction for a synchronization interval. This provides a sustainable and adaptable technical solution for managing a synchronization interval as context changes over time. As the synchronization interval may be managed on a user-by-user basis, trained AI learning can continuously learn from user behaviors and preferences and form usage patterns that may be used to generate accurate predictions usable to manage a synchronization interval. The classification prediction may then be utilized for modification of a synchronization interval, thereby providing efficient management of computing resources during execution of an exemplary application/service.

In some technical examples a synchronization interval classification prediction may be based solely on evaluation of historical device usage data pertaining to computing devices of a user account. In other technical examples, a synchronization interval classification prediction may be based on a contextual evaluation that correlates historical usage data with real-time (or near real-time) signal data collected for a user account. In other alternative examples, contextual evaluation may use only real-time (or near real-time) signal data to generate a synchronization interval classification prediction. In further examples, telemetry data collected across a plurality of user accounts may be utilized in a comparative analysis to predict user patterns of access to content portions. For instance, signal-data pertaining to a device configuration that a user is currently using may be an indication as to whether a user may intend to access a specific electronic document or content portion at a future point in time. This may be especially true in instances where trained AI processing may correlate user access with historical device usage data, thereby identifying usage patterns specific to a user account (or group of user accounts).

In one example, contextual factor analysis comprises identifying an access history of a plurality of client devices linked with a user account. For instance, a user may utilize a plurality of different computing devices (e.g., mobile phone, laptop, tablet, PC, smartwatch) to access content (e.g., a specific content portion) provided through an application/service. Different aspects of user access to content may be evaluated, such as recency of access to content portions by specific client devices associated with a user account, whether the user edited/modified the content or merely loaded the same for viewing, and triggers for causing user access (e.g., did the user receive an email or message directing them or have a calendared deadline or meeting), among other technical aspects. In some further examples, telemetry data across a plurality of user accounts may be usable in a determination of a synchronization interval classification prediction. For instance, user device access history to one or more content portions by a specific user account is evaluated comparative to that of other user accounts, which may be used to predict how likely it is that a user account may attempt to access a content portion in the future.

Evaluation of contextual data may be useful to predicting an amount of future access and/or editing for a content portion so that a synchronization interval can be set accordingly. Historical usage data pertaining to access by specific devices of a user account may be leveraged to predict the probability of content portion (e.g., section of content) being used on one or more devices. In most cases, users may follow the same usage patterns for access to specific content. For instance, a user may only access content once over a predetermined time period, where the same type of client device is used to access the content. If the probability is high that the content portion (e.g., section) is unlikely to be accessed by multiple client computing devices over a given time period, a synchronization interval for synchronizing data/metadata for that content portion can set to a slower synchronization interval without a high risk for potential data loss. If the probability is high that the content portion (e.g., section) is likely to be accessed by two or more client computing devices over a given time period, the synchronization interval can be set to a faster synchronization interval. In some cases, a synchronization interval may be set to an interval that is most efficient as compared with technical scenario where an application/service is continuously synchronizing content every second (e.g., in real-time or near real-time).

Exemplary technical advantages provided by processing described in the present disclosure comprise but are not limited to: ability to automatically collect signal data and utilize the signal data for contextual analysis of a synchronization interval; ability to generate classification predictions for a synchronization interval; ability to adjust/modify a synchronization interval for synchronization of data associated with an application/service including the ability to set synchronization intervals for specific content portions and specific to user accounts; ability to automatically modify a synchronization interval based on contextual analysis limiting manual operations required; generation and management of AI processing (e.g., AI learning modeling) that is configured for generating classification predictions for a synchronization interval; improving processing efficiency (e.g., reduction in processing cycles, saving resources/bandwidth, better management of server farms) for computing devices utilized for synchronization of content of an application/service; reduction in latency during execution of data synchronization; an improved user experience of an application/service through better management of a synchronization interval; and interoperability to implement processing described herein across a plurality of technical scenarios and extensibility enhance management of synchronization intervals across a plurality of different types of applications/services, among other technical advantages.

FIG. 1A illustrates an exemplary system diagram 100 providing an interaction between components that are configured for management of a synchronization interval as described herein, with which aspects of the present disclosure may be practiced. Components in system diagram 100 comprise but are not limited to: one or more computing devices 102; an application/service component 104; synchronization predictions components that comprise a web management component 106 and a synchronization interval evaluation component 108;
knowledge repositories 110; and an AI processing component 112.

As an example, components illustrated in system diagram 100 may be executed by an exemplary computing system 401 (or multiple computing systems) as described in the description of FIG. 4. System diagram 100 describes components that may be utilized to execute processing operations described in system diagram 120 (FIG. 1B), process flow 200 (FIG. 2), method 300 (FIG. 3A) and method 320 (FIG. 3B). Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software application platform that also provides, to a component, access to and knowledge of other components that are associated with applications/services. In one instance, processing operations described in system diagram 100 may be implemented by one or more components connected over a distributed network.

The one or more computing devices 102 may be any electronic device configured for data processing. A user may utilize the computing device 102 to access and modify content provided through different applications/services. As such, a computing device 102 referenced herein may be a client computing device that a user may utilize for access to content of an application/service (e.g., provided by the application/service component 104 executing on the computing device 102 or connected with the computing device 102 over a network connection). Non-limiting examples of computing device comprise but are not limited to: a phone (e.g., smartphone), a laptop, a tablet, a desktop computer, wearable computing device, and a gaming console. Component-wise, an example of a computing device 102 is a computing system (or computing systems) as described in the description of FIG. 4. A client/user may utilize the computing device 102 to connect to an application/service through any number of different device modalities. In some examples, a user may connect to an application/service (e.g., distributed data storage service; productivity service) through different user computing devices 102 one at a time or concurrently. A computing device 102 may also be utilized for collaborative access to content provided through applications/services.

The application/service component 104 is configured to provide an application/service, for example, that is accessed via computing device 102. An application/service may be any type of programmed software. Examples of applications/services comprise but are not limited to: gaming applications/services; content streaming applications/services; word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/services, directory applications/services, mapping services, calendaring services, electronic payment services, digital data storage or distributed data storage applications/services, web conferencing applications/services, call communication applications/services, language understanding applications/services, bot framework applications/services, networking applications/service, team collaborative applications/services and social networking applications/services, among other examples. In some examples, an exemplary application/service may be integrated into a software application platform providing access to a suite of applications/services. Moreover, specific application/services as well as application platform suites (e.g., software application platform providing correlated access to a plurality of applications/services) may be configured to interface with other non-proprietary application/services (e.g., third-party applications/services) to extend processing described herein.

The application/service component 104 is configured to interface with the one or more computing devices 102 to enables a user to access electronic content. Electronic content may be any content accessed via a computing device as known to one skilled in the field of art. Non-limiting examples of electronic content comprise but are not limited to: an electronic document including web page content accessed through a browser; multiple electronic documents; one or more portions of content (e.g., a section of content in one or more electronic documents); grouping of electronic documents such as a notebook of electronic content; channels providing one or more users with access to content; and messaging content including instant messages and emails, among other examples. For instance, consider an example where an application/service is a notetaking application/service. Notetaking applications/services may manage content at various levels including at a document-level, a page-level (e.g., a section of content), a notebook level, etc., where users may be attempting to access content at any of the various levels.

As indicated above, the application/service component 104 may further be configured to provide access to a user access to a software application platform that may enable users to access a suite of applications/services. One non-limiting example of a suite of applications/services is Office365® that provides a user to access to a variety of different types of applications/services via a user account. A user account may be associated with access to one or more applications/services. In some instances, the user account may also be specific to a user profile of a specific computing device (e.g., of the one or more computing devices 102).

In any example, contextual data related to user activity through the one or more computing devices 102, user account profiles, applications/services, etc., may be collected to enable users to complete tasks through the one or more applications/services. Contextual data (e.g., telemetry data, log data, signal data, or any combination thereof) may also be utilized to enhance operation of applications/services, through interfacing with one or more other components configured to execute specific tasks. Collection of contextual data occurs while obeying laws and regulations for protecting privacy of user data (e.g., with user consent). Processing operations to collect contextual data is known to one skilled in the field of art. Above what is known in the field of art, the collected contextual data may be analyzed for execution of a specific task purpose such as generation of a synchronization interval classification prediction for managing a synchronization interval. The synchronization interval is usable to guide synchronization of content between local data storage (e.g. a cache of a computing device 102 and a distributed data storage storing data for an application/service).

Exemplary synchronization prediction components comprise a web management component 106 and a synchronization interval evaluation component 108. The web management component 106 is a web-based network component for one or more applications/services. Among other functions, the web management component 106 is configured to initiate a WebSocket or the like, enabling connection between a computing device 102 of the user and an application/service. An exemplary WebSocket is communications protocol for provision of a persistent, bi-directional, full duplex TCP connection between a user's web browser to a server. Processing for initiating a WebSocket or similar type of component and establishing a connection via the same is known to one skilled in the field of art. As an example, the WebSocket may be utilized to initiate a web socket connection by sending a WebSocket handshake request from a browser's HTTP connection to a server to upgrade the connection or the like.

To manage a WebSocket connection, the web management component 106 implements a handler component (e.g., WebSocket handler). An exemplary handler component is configured to manage state, messaging and lifecycle events for processing via a WebSocket connection. Implementation of a handler component is known to one skilled in the field of art. Above what is known, the web management component 106 is configured to re-direct processing that pertains to management of a synchronization interval. Instead of reading a hard-coded synchronization interval as typically done in traditional system implements, the web management component 106 is adapted to interface with the synchronization interval evaluation component 108 to query the synchronization interval evaluation component 108 and request a recommended synchronization interval (e.g., a synchronization interval classification prediction). The web management component 106 is then configured to set/modify/adjust a synchronization interval based on a received synchronization interval classification prediction received from the synchronization interval evaluation component 108.

Among other technical advantages, the synchronization interval evaluation component 108 is configured to interface with the web management component 106 to execute processing operations related to generation of a synchronization interval classification prediction. In doing so, a synchronization interval evaluation component 108 is configured to execute any of the processing operations described in the foregoing description as well as those described in system diagram 120 (FIG. 1B), process flow 200 (FIG. 2), method 300 (FIG. 3A) and method 320 (FIG. 3B). The synchronization interval evaluation component 108 is configured to implement one or more of a programmed software module and AI processing, or a combination thereof to generate a synchronization interval classification prediction. As an example, the synchronization interval evaluation component 108 may interface with the AI processing component 112 to analyze contextual data (e.g., associated with a user account) and generate the synchronization interval classification prediction. For example, the synchronization interval evaluation component 108 receives a query, from the web management component 106, requesting the synchronization interval classification prediction. This may be a trigger for generating and/or returning the synchronization interval classification prediction to the web management component 106, which may then configure a synchronization interval accordingly.

The knowledge repositories 110 of system diagram 100 comprise one or more data storages for storage of data and/or metadata to enable processing of the present disclosure to occur. As such, knowledge repositories 110 may comprise one or more of: physical data storage, virtual data storage or a combination thereof. This may comprise data storage that is stored locally in memory (e.g., cache) of a computing device 102, data that is stored on one or more distributed data storages, or a combination thereof. Data stored thereon comprises data including but not limited to: data that enables generation and execution of application/service generation, where a user may connect with an application/service and access content through the application/service; data that enables execution of processing by the synchronization prediction components (e.g., the web management component 106 and the synchronization interval evaluation component 108); collected contextual data including telemetry data; programmed operations/listeners for capturing signal data; data that enables generation and application of AI processing (e.g., AI learning model used to generate a synchronization interval classification prediction); training data for training AI modeling to generate a synchronization interval classification prediction; and data for managing a synchronization interval, among other examples.

System diagram 100 may further comprise an AI processing component 112. The AI processing component 112 interfaces with synchronization prediction components (106,108) and knowledge repositories 110 to provide AI processing capabilities to enable processing operations of the present disclosure to be executed. The AI processing component 112 is configured to manage the generating, training and update of AI processing (e.g., trained AI learning modeling). The AI processing component 112 executes processing operations related to training of an exemplary classifier for artificial intelligence processing as well as content retrieval processing using a trained classifier. AI processing may be trained to generate exemplary classification predictions for management of a synchronization interval. In any case, the AI processing component 112 is configured to execute AI processing. For instance, artificial intelligence processing may comprise the application of AI data modeling to generate a classification prediction for management of a synchronization interval based on analysis of contextual factors that are used to predict subsequent access to content (e.g., a content portion).

Implementation of artificial intelligence processing, including generating and maintaining AI data modeling, is known to one skilled in the field of art. Above what is generally known, exemplary AI processing is trained to generate synchronization interval classification prediction as described herein. This comprises adapting AI processing to execute specific processing operations including training of AI modeling using specific contextual data described herein including interfacing between components of system diagrams shown in FIGS. 1A-2. In doing so, AI processing (e.g., one or more trained AI learning models), is applicable to aid any type of determinative or predictive processing via any of the following: supervised learning; unsupervised learning; semi-supervised learning; or reinforcement learning, among other examples. Examples of supervised learning that may be applied comprise but are not limited to: nearest neighbor processing; naive bayes classification processing; decision trees; linear regression; support vector machines (SVM); and neural networks, among other examples. Examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Examples of semi-supervised learning that may be applied comprise but are not limited to: assumption determination processing; generative modeling; low-density separation processing and graph-based method processing, among other examples. Examples of reinforcement learning that may be applied comprise but are not limited to: value-based processing; policy-based processing; and model-based processing, among other examples. In some examples, the artificial intelligence processing may be configured to apply a ranker to determine a best possible result to output based on ranking/scoring processing. For instance, a highest ranking/scored output (or outputs) of the artificial intelligence processing may be utilized to determine a best applicable synchronization interval.

Figure 1B:
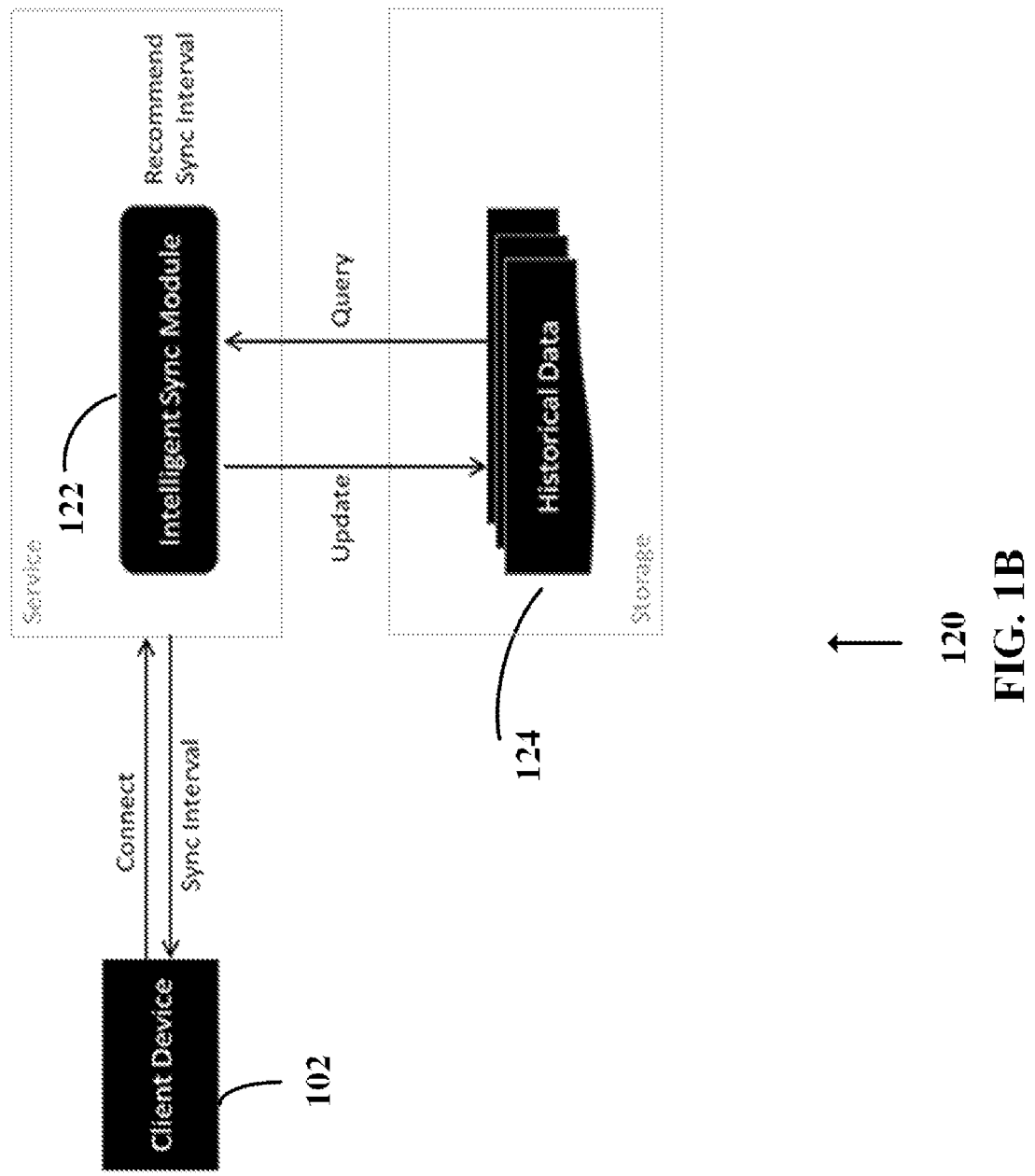
FIG. 1B illustrates an exemplary system diagram providing an interaction between a client device and exemplary synchronization prediction components as described herein, with which aspects of the present disclosure may be practiced.

FIG. 1B illustrates an exemplary system diagram 120 providing an interaction between a client device and exemplary synchronization prediction components as described herein, with which aspects of the present disclosure may be practiced. System diagram 120 provides identification of interaction between components that may be utilized to manage a synchronization interval for an exemplary application/service such as a notetaking application/service. As such, system diagram 120 describes a specific example where a synchronization interval is managed in the context of a specific application/service (e.g., notetaking application/service) and where historical data (e.g., historical device usage data), among other types of context data, is utilized to generate a synchronization determination. As an example, an exemplary synchronization interval may be utilized for synchronizing a content portion (e.g., section of a notebook) in the notetaking application/service.

The client device 102 is an example of a computing device 102 as described in system diagram 100 (FIG. 1A). In system diagram 120, the client device 102 may be utilized to launch the notetaking application/service and provide access to content provided therethrough. In doing so, the client device 102 may interface with an exemplary web management component 106 (of FIG. 1A), that launches a web-based version of the notetaking application/service through initiation of a WebSocket. This may comprise transmission of communications between a client device 102 and a WebSocket handler (e.g., handler component as referenced in the description of system diagram 100 (FIG. 1)), resulting in initiation of a user session through the notetaking application/service.

The WebSocket handler may be configured to interface with an intelligent sync module 122. The intelligent sync module 122 is software module configured to execute processing operations of a synchronization interval evaluation component (108 as referenced in FIG. 1A). As an example, the WebSocket handler may initiate communication with the intelligent sync module 122 to generate a synchronization interval classification prediction for a synchronization interval usable to synchronize content through the notetaking application/service. The synchronization interval may be used to identify a time between synchronize request processing when synchronizing a locally stored version of content with a version of the content maintained by the distributed data storage (e.g., a version of content that is to be loaded for subsequent user access/usage through a notetaking service). As referenced above, the synchronization interval may be set specific to a user account, a plurality of user accounts (e.g., group of user accounts in a team/ collaborative space) and may be further set specific to one or more content portions accessed through an application/service.

The intelligent sync module 122 is configured to execute processing to generate a synchronization interval classification prediction as well as manage a state of contextual data, which is usable to generate a synchronization interval prediction. As an example, a query may be received from the web management component 106 (of FIG. 1A), through the WebSocket handler, to generate a synchronization interval classification prediction. In response to receipt of the query, the intelligent sync module 122 acts as an interface to obtain contextual data including access data to specific content (e.g., one or more content portions) provided through the notetaking application/service. In one example, this comprises obtaining historical device usage data 124. The historical device usage data 124 provides logged records of access to content (one or more content portions). Historical device usage data 124 indicates a history of prior access to content of an application/service (e.g., the notetaking application/service). This may comprise data that identifies specific access by any of a plurality of client devices associated with a user account, access by client devices associated with other user accounts, identification of whether access occurred concurrently with other devices, etc. In one example, historical device usage data 124 provides records of access a specific section of content in an electronic notebook provided through a notetaking application/service.

The historical device usage data 124 may be filtered for access to a content portion by client devices associated with a specific user account and/or a group of user accounts. A user account may be that which was used to initiate a user session, where the user account is signed-in to an application/service when establishing a connection via the WebSocket handler. In some examples, historical device usage data 124 may need to be filtered from access data from a plurality of different user accounts that were utilized to access a content portion. In any case, historical device usage data 124 is identified specific to access to content by devices associated with a specific user account. As a non-limiting example, historical device usage data 124 may comprise metadata identifying a specific content portion (e.g., the section in an electronic notebook provided through the notetaking application/service); one or more entries providing an identifier of a device used to access a content portion (e.g., section); and timestamp information for access to the content portion (e.g., section) by a device. Additionally, more specific attributes of device access to content by specific client devices may also be collected via the historical device usage data 124 including but not limited to: indication of device software installations and operating system (OS) information for specific client devices; indication of version information of a specific application/service when a content portion was accessed via a specific client device; timestamp information indicating a history of access to a content portion by a device over a predetermined time period; indication of modification of a content portion by a device such as edits made to a content portion over a predetermined time period; indication of access to the content portion by other user accounts during a predetermined time period including concurrent access with devices of a user account; locational data and correlation with access to content portion by one or more user accounts; and cross-application/service data during access such as message content (IM, email, etc.), among other non-limiting examples.

Traditionally, access to content portions may be stored in metadata. However, previous metadata stored relating to access to content portions of an application/service did not comprise specific record of device access to a specific content portion such that it identifiable to track specific device access (e.g., of a user account) over a predetermined time period. The present disclosure enables modification of stored metadata for an application/service such that device identifier information can be obtained for access to content portions including timestamp data for specific device access (e.g., specific devices of a user account) and identification of device access over a predetermined time period. As such, the intelligent sync module 122 is configured to generate novel queries to obtain versions of historical device usage data 124 and subsequently analyze the historical device usage data 124, among other contextual factors, to generate a synchronization interval classification prediction based on historical usage patterns of a user. This enables synchronization interval classification predictions to be made for specific user accounts and thereby customize synchronization intervals on a user-by-user basis, while accounting for various patterns in user access.

In one example, the intelligent sync module 122 may analyze the historical device usage data 124 to determine how many client devices associated with a user account accessed a content portion over a predetermined time period. The predetermined time period may be set at the discretion of the developers without departing from the spirit of the present disclosure. In many examples, the predetermined time period may correspond with laws, regulations and/or policies set for data retention, where the predetermined time period may be a period of time less than or equal to that allowed by said laws, regulations and/or policies. As an example, a predetermined period of time may be set so the time period is less than a month (e.g., 14 days or 28 days). The synchronization prediction component, implementing the intelligent sync module 122, may be configured to update record of historical device usage data in manner such as: managing metadata fields stored in log data and/or telemetry data; creating new entries indicating device access to a content portion within a predetermined time period in log data; updating records/entries in log data to reflect new access to the content portion by a specific device during the predetermined time period; and deleting entries in log data that are older than/exceed the predetermined time period (e.g., delete stale entries older than 28 days), among other examples.

The intelligent sync module 122 generates a synchronization interval classification prediction that is usable as a suggestion for setting a synchronization interval for synchronizing one or more content portions during specific user account access. In one example, this may occur based on a result of the analyzing of the historical device usage data 124 of the user account (e.g., determine historical usage patterns for a user account over a predetermined time period individually and/or relative to device access history of other user accounts). For instance, analysis of historical device usage data 124 may yield a determination as to whether a user account utilizes two or more of its client devices, linked to the user account, to access content over a predetermined time period. This may be an indicator that a synchronization interval should be set to occur more frequently as it is highly likely that data will need to be synchronized across different user devices in the near future. Empirical research shows that sync patches account for about 30 percent of all data synchronization and backup, and that number will continue to increase as more user accounts are added and more data is required to be backed-up. Current synchronization schedules call for a synchronization patch to occur every 10 seconds (0 seconds for co-authoring/collaborative instances). However, frequent patches may not always be necessary because eighty percent of content portions are in fact only used on a single device in a short time period (e.g., a day or week). As such, contextual evaluation can greatly improve processing efficiency of an application/service (and allocated computing resources), where historical device usage data 124, among other types of contextual data, is used predict the probability of a content portion being used on a single computing device (or multiple computing devices). If the probability is high that access may occur only through a single device associated with a user account, a synchronization interval for that specific content portion can be made slower, thereby conserving computing resources and reducing latency, among other technical advantages. The number of devices (e.g., one or more), used to access a content portion over a predetermined time period, is an indicator to generate a synchronization interval classification prediction that recommends a slower synchronization interval (e.g., every 30 seconds) or a faster synchronization interval (e.g., every 10 seconds).

After generating the synchronization interval classification prediction, the intelligent sync module 122 then returns the synchronization interval classification prediction to a web management component of an application/service via the WebSocket handler. The web management component utilizes the synchronization interval classification prediction to set a synchronization interval for synchronizing one or more specific portions of content during user access.

Figure 2:
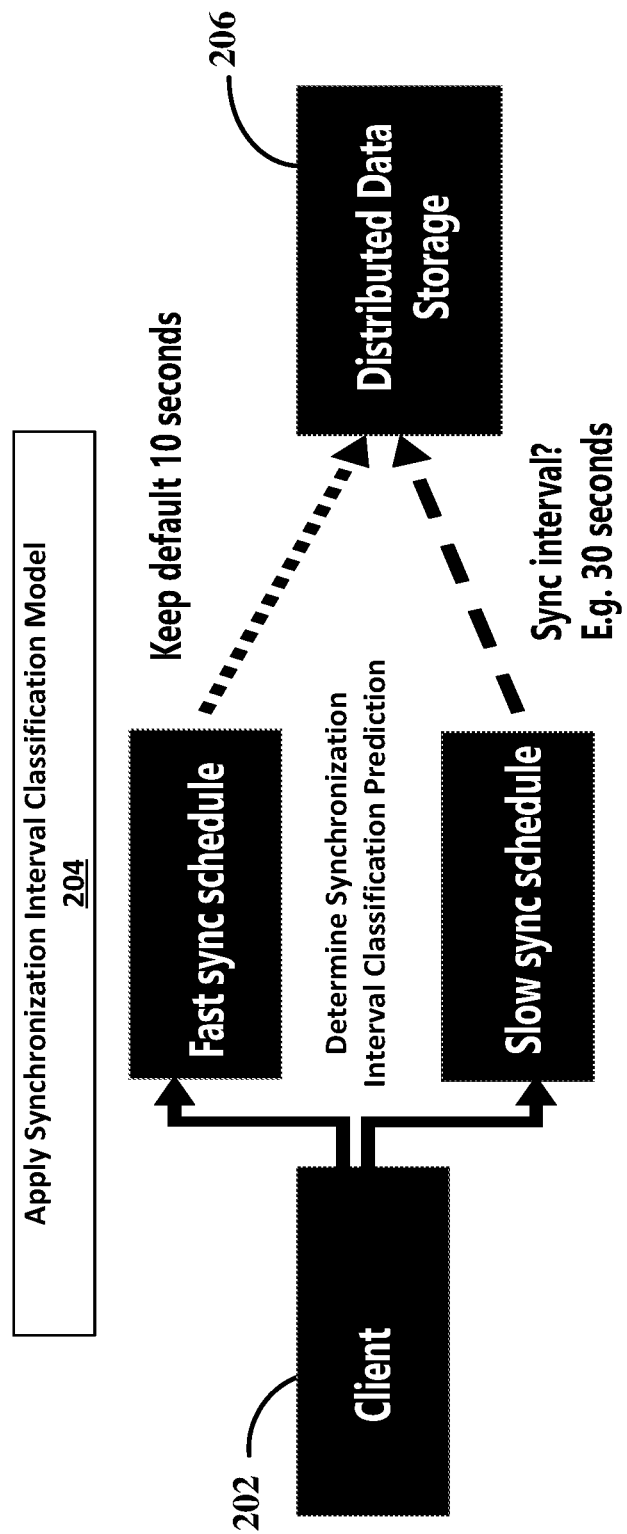
FIG. 2 illustrates an exemplary process flow for management of synchronization of content between a client device and distributed data storage as described herein, with which aspects of the present disclosure may be practiced.

FIG. 2 illustrates an exemplary process flow 200 for management of synchronization of content between a client device and distributed data storage as described herein, with which aspects of the present disclosure may be practiced. Process flow 200 illustrates processing for determining a synchronization interval that is utilized to synchronize data for an application/service (e.g., data for a content portion) between a client 202 and a distributed data storage 206. Process flow 200 is intended to illustrate technical examples where processing, for generation of synchronization interval classification prediction and subsequent management of a synchronization interval, occurs via one or more computing devices that are separate from the client device 202. For instance, processing may occur over one or more computing devices that are connected with the client device 202 over a network connection, and then subsequently manage, in a distributed manner, synchronization of versions of content between the client device 202 and a distributed data storage 206 during a user session of an application/service.

An occurrence of a user session is detected, where a user account may be accessing content provided through an application/service via the client 202 (e.g., a client computing device). AI processing is applied, via one or more distributed computing components that may analyze contextual data and generate a synchronization interval classification prediction for synchronizing content during the user session. For instance, a synchronization interval classification model 204 is applied and used to generate a synchronization interval classification prediction. The synchronization interval classification model 204 may be a trained AI learning model that is applied and used to generate a synchronization interval classification prediction.

The synchronization interval classification prediction is then used to determine a synchronization interval for synchronizing content between the client 202 and the distributed data storage 206. For instance, it may be determined whether to keep a synchronization interval at a fast rate (e.g., synchronization occurring every 10 seconds) or set a slower synchronization schedule (e.g., synchronization occurring every 30 seconds). The synchronization interval may then be set/adjusted accordingly. For example, the synchronization interval classification prediction may be propagated to a web management component of an application/service to set the synchronization interval. During the user session, content may be synchronized between data storage of the client 202 and the distributed data storage 206 based on the synchronization interval.

FIG. 3A illustrates an exemplary method 300 for generating and training artificial intelligence modeling configured to generate a synchronization interval classification prediction, with which aspects of the present disclosure may be practiced.

FIG. 3B illustrates an exemplary method 320 for managing a synchronization interval based on generation of synchronization interval classification predictions, with which aspects of the present disclosure may be practiced.

As an example, methods 300 and 320, respectively, may be executed across an exemplary computing system 401 (or computing systems) as described in the description of FIG. 4. Exemplary components, described in methods 300 and 320, may be hardware and/or software components, which are programmed to execute processing operations described herein. Operations performed in method 300 and 320 may correspond to operations executed by a system and/or service that execute computer programs, software agents, intelligent bots, application programming interfaces (APIs), plugins, neural networks and/or machine-learning processing, among other examples. That is, any of the foregoing components may execute processing operations described in the present disclosure including specific processing operations described in methods 300 and 320. In some examples, a system may comprise execution of one or more components (e.g., on a server-side and/or client side) to achieve processing described herein. In one instance, processing operations described in method 300 and 320 may be implemented by one or more components connected over a distributed network connection. In other examples, processing operations described in methods 300 and 320 may be executed by one or more components executing on a client computing device, where said one or more components may interface with server-side components to enable execution of processing operations described herein.

As identified above, method 300 relates to generation and training of artificial intelligence modeling configured to generate a classification prediction for a synchronization interval. Method 300 begins at processing operation 302, where AI modeling is generated that is configured for classification prediction of a synchronization interval. Generation of trained AI modeling has been described in the foregoing description with reference to AI processing (e.g., via the AI processing component 112 of FIG. 1A). As identified in the foregoing description, a synchronization interval is an indication of a time interval between synchronization requests that are used to synchronize data for an application/service between local data storage (e.g., client computing device) and distributed data storage. For instance, data of an application/service that is locally stored data (e.g., local cache of a client computing device) is synchronized with a distributed data storage. The distributed data storage may be utilized by an application/service utilizes to maintain current versions of electronic documents for user access (e.g., individual user access and collaborative user access). In one example, the distributed data storage may be specific to the application/service. In other examples, the distributed data storage may be a component of a software collaborative platform that is used by a plurality of applications/services including the application/service. An exemplary synchronization interval may be applicable for synchronization of any type of content including a specific content portion (e.g., section in an electronic document and/or grouping of electronic documents); an electronic document; all data of an application/service, etc.

At processing operation 304, training data representative of context data (contextual data) is acquired for training of the AI modeling. Training data may comprise a corpus of context data (contextual data), that usable to configure the AI modeling to efficiently and accurately generate synchronization interval classification predictions. Context data comprises but is not limited to a corpus historical device usage data including log data for access to content portions provided through an application/service; signal data collected at various levels (e.g., user-specific signal data, application/service-specific signal data, device-specific signal data); and telemetry data of any kind (including comparative analysis across different user accounts), among other examples. Context data for training may be varied across different contextual scenarios (e.g., different user usage patterns) to provide a realistic corpus of training data for training processing. Analysis of a corpus of training data may help train an AI classifier to identify what forms of context data are most valuable to generating classification predictions as well determining weightings for determining contextual factors that are used to generate predictions.

At processing operation 306, an exemplary classifier of the AI modeling is trained for generating a classification prediction for a synchronization interval. General processing for training AI modeling is known to one skilled in the field of art. Above what is known, processing operation 306 may comprise utilizing the corpus of training data to generate synchronization interval classification predictions. Training may further comprise applying one or more iterative phases of training to fine-tune the AI modeling.

At processing operation 308, accuracy of a trained classifier of the AI modeling is tested. Processing 308 may comprise determining an accuracy threshold set by developers pertaining to accuracy of synchronization interval classification predictions. Processing operation 308 comprises testing/confirming accuracy of generated synchronization interval classification predictions (e.g., in offline scenarios, online scenarios or a combination thereof). For example, synchronization interval classification predictions may be generated, and data collected may be evaluated offline so as not to impact a user experience through an application/service until the trained classifier is operating at a sufficiency accuracy threshold.

Flow of method 300 may proceed to decision operation 310. At decision operation 310, it is determined whether the accuracy of AI classifier is sufficient for exposing the AI modeling for real-time (near real-time) usage. In examples where it is determined that the accuracy of the AI classifier is insufficient, flow of decision operation 310 branches NO, and processing of method 300 returns back to processing operation 306 to re-train the classifier. In examples where it is determined that the accuracy of the AI classifier is sufficient, processing of decision operation 310 branches YES and processing of method 300 proceeds to processing operation 312.

At processing operation 312, trained AI modeling is exposed for real-time (or near real-time) application/service usage.

In some examples, flow of method 300 may proceed to decision operation 314. At decision operation 314, it is determined whether an update to the AI modeling is to be applied. For instance, new signal data (telemetry data), corpus of training data, etc., may become available to update/re-train the classifier to improve accuracy in generating classification predictions for a synchronization interval. In some instances, signal data may comprise user feedback on the accuracy of the classification predictions. In examples where it is determined that the AI modeling is to be updated, flow of decision operation 314 branches YES, and processing of method 300 returns back to processing operation 306 to re-train the classifier. In examples where it is determined that the AI modeling is not to be updated, processing of decision operation 314 branches NO and processing of method 300 ends/remains idle until subsequent processing is to commence.

As identified above, method 320 relates to processing for managing a synchronization interval. Method 320 begins at processing operation 322, where a query is received requesting a synchronization prediction for setting a synchronization interval usable to synchronize data/metadata associated with an application/service. As an example, a web management component of an application/service is configured to generate and transmit a query to a synchronization interval evaluation component requesting a synchronization interval classification prediction synchronizing content during a user session. An exemplary user session may is associated with a user account that is used to access content through an application/service.

In response to receiving (processing operation 322) the query, method 320 may proceed to processing operation 324, where trained AI modeling is initiated that is configured to generate a classification prediction for an exemplary synchronization interval. A classification prediction is a synchronization interval classification prediction, where trained AI processing (e.g., a trained AI learning model) may be utilized to execute processing operations related to generation of the synchronization interval classification prediction as well as any of the processing operations described in method 320.

At processing operation 326, the trained AI modeling is configured to acquire and analyze context data usable to generate the synchronization interval classification prediction. Processing operations related to acquiring specific types of data for evaluation by trained AI modeling are known to one skilled in the field of art. Above, what is known, the present disclosure describes the specific types of context data that may be utilized in an evaluation to generate a synchronization interval classification prediction. As indicated in the foregoing description, context data comprises but is not limited to: historical device usage data including log data for access to content portions provided through an application/service; signal data collected at various levels (e.g., user-specific signal data, application/service-specific signal data, device-specific signal data); and telemetry data of any kind (including comparative analysis across different user accounts), among other examples. The trained AI modeling may be configured to identify relevant portions of context data as input for processing and utilize available context data to generate an output of a synchronization interval classification prediction. This may comprise processing operations that parse and analyze specific context data to determine relevant aspects that may impact generation of a synchronization interval classification prediction. It follows that context data, available at any given point in time, may vary, for example, where historical device usage data may have been recently reset due to data retention policies, signal data (historical or current) may or may not be available, etc.

Processing operation 326 comprises analyzing historical device usage data for a content portion (e.g., by a user account) to determine patterns of device access by a user via a plurality of devices associated with a user account. For example, determinations may be generated, based on a result of the analyzing of the historical device usage data of the user account, as to how many different client devices (e.g., of a user account) accessed a content portion over a predetermined time period. In further examples, determinations may also be generated regarding specific aspects of user access to a content portion. For instance, processing operation 326 comprises execution of processing operations to parse the historical device usage data of the user account to determine whether any of the plurality of client devices modified the content during the predetermined time period. In one example, a correlation result may be determined based on a correlation of data indicating whether multiple client devices accessed a content portion during a predetermined time period with data indicating whether multiple client devices modified the content during the predetermined time period. As such, patterns of modification of a content portion (and how and when the content portion was modified) may be a key attribute to identify as a contextual factor that may be used to predict future usage patterns pertaining to a content portion.

In some technical examples a synchronization interval classification prediction may be based solely on evaluation of historical device usage data pertaining to computing devices of a user account. Examples of historical device usage data have been provided in the foregoing description, where any type/aspect of historical device usage data previously described may be used as a basis (or correlated with other aspects of context data) to generate a synchronization interval classification prediction. Telemetry data may be generated from metric data provided in historical device usage data, where results of telemetry data may then be the basis for generation of a synchronization interval classification prediction.

In other technical examples, a synchronization interval classification prediction may be based on a contextual evaluation that correlates historical usage data with real-time (or near real-time) signal data collected for a user account. In other alternative examples, contextual evaluation may use only real-time (or near real-time) signal data to generate a synchronization interval classification prediction. In further examples, telemetry data collected across a plurality of user accounts may be utilized in a comparative analysis to predict user patterns of access to content portions. For instance, signal-data pertaining to a device configuration that a user is currently using may be an indication as to whether or not the user may intend to access a specific electronic document or content portion. This may be especially true in instances where trained AI processing may correlate user access with historical device usage data, thereby identifying usage patterns specific to a user account (or group of user accounts).

In one example, contextual factor analysis comprises identifying an access history of a plurality of client devices linked with a user account. For instance, a user may utilize a plurality of different computing devices (e.g., mobile phone, laptop, tablet, PC, smartwatch) to access content (e.g., a specific content portion) provided through an application/service. Different aspects of user access to content may be evaluated, such as recency of access to content portions by specific client devices associated with a user account, whether the user edited/modified the content or merely loaded the same for viewing, and triggers for causing user access (e.g., did the user receive an email or message directing them or have a calendared deadline or meeting), among other technical aspects. In some further examples, telemetry data across a plurality of user accounts may be usable in a determination of a synchronization interval classification prediction. For instance, user device access history to one or more content portions by a specific user account is evaluated comparative to that of other user accounts, which may be used to predict how likely it is that a user account may attempt to access a content portion in the future.

Evaluation of contextual data may be useful to predicting an amount of future access and/or editing for a content portion so that a synchronization interval can be set accordingly. Historical usage data pertaining to access by specific devices of a user account may be leveraged to predict the probability of content portion (e.g., section of content) being used on one or more devices. In most cases, users may follow the same usage patterns for access to specific content. For instance, a user may only access content once over a predetermined time period, where the same type of client device is used to access the content. If the probability is high that the content portion (e.g., section) is unlikely to be accessed by multiple client computing devices over a given time period, a synchronization interval for synchronizing data/metadata for that content portion can set to a slower synchronization interval without a high risk for potential data loss. If the probability is high that the content portion (e.g., section) is likely to be accessed by two or more client computing devices over a given time period, the synchronization interval can be set to a faster synchronization interval. In some cases, a synchronization interval may be set to an interval that is most efficient as compared with technical scenario where an application/service is continuously synchronizing content every second (e.g., in real-time or near real-time).

At processing operation 328, contextual factors are determined that may be used for best determining a classification prediction for a synchronization interval. Contextual factors as described herein are intended to refer to specific types of context data that may be used as the basis for generating a synchronization interval classification prediction. Contextual factors are determined (processing operation 328) based on a result of training processing of a trained classifier of AI modeling.

In some examples, different versions of AI modeling may be trained and applied by developers. For instance, a first iterative instance of AI modeling may be specific to usage of historical device usage data as the basis for generating synchronization interval classification prediction. Later iterations of trained AI modeling may be configured to perform a more comprehensive evaluation of a context using collected signal data and/or telemetry data to enhance accuracy of classification predictions. In some examples, different contextual factors may be assigned weighting values, which may enable developers to prioritize the aspects of contextual data that they believe is most important to generating an accurate synchronization interval classification prediction. Contextual factors that are applicable may be based on result of analysis of contextual data, including analysis of historical device usage data.

At processing operation 330, a classification prediction for a synchronization interval is generated. As indicated in the foregoing description, the synchronization interval is used to synchronize data for the content portion between a local data storage (e.g., local cache of a client computing device) with a distributed data storage. The classification prediction may be generated (processing operation 330) based on results of applying the trained classifier of the AI processing. In at least one example, the classification prediction is based on evaluation of contextual factors. In one example, this may comprise a result of the determining of the number of client devices that accessed the content over the predetermined time period. As indicated in the foregoing description, this may be a likely indicator of future access to a specific content portion. As further indicated in the foregoing description, a classification prediction may further be based on a more comprehensive analysis of context data.

To generate the classification prediction, AI processing may execute ranking processing that generates a probability scoring indicating whether a content portion (e.g. section) is likely to be accessed by a set number of devices over a future time period. Said probability scoring is determined based on results of applying the AI processing to evaluate the contextual factors. Based on the probability scoring, a determination may be made as to whether or not to adjust/modify a synchronization interval. In one example, the classification prediction for the synchronization interval is a recommendation to adjust the synchronization interval to a shorter interval based on a determination that multiple client devices (e.g., of one or more user accounts) accessed a content portion over the predetermined time period. In another example, the classification prediction for the synchronization interval is a recommendation to adjust the synchronization interval to a longer interval based on a determination that less than two client computing devices accessed a content portion over a predetermined time period. In other instances, a classification prediction may be a determination to leave the synchronization interval unchanged.

In some examples, the classification prediction for the synchronization interval may be transmitted (processing operation 332) to a component that may then use the classification prediction to modify the synchronization interval. For example, a component that generates the synchronization interval classification prediction may be different from that which modifies the synchronization interval. In some alternative examples, the AI modeling may be configured to automatically modify the synchronization interval based on the classification prediction generated.

Flow of method 320 may proceed to decision operation 334, where it is determined whether a synchronization interval is to be modified based on the classification prediction. In examples where the classification prediction indicates to modify the synchronization interval, flow of decision operation 334 branches YES and processing of method 320 proceeds to processing operation 336.

At processing operation 336, the synchronization interval is modified. The synchronization interval may be modified based on the classification prediction for the synchronization interval generated based on application of the AI processing. Modification of a synchronization interval may be configured to last for any determined amount of time. In one instance, an application/service is configured to determine a synchronization interval for each instance of a user session. In other instances, a synchronization interval may be set at scheduled amount of time (e.g., weekly, monthly, yearly), thereby enabling usage patterns to be identified over a given time period to provide more context for a classification prediction.

In examples where the classification prediction indicates that the synchronization interval is not to be modified, flow of decision operation 334 branches NO and processing of method 320 proceeds to processing operation 338.

At processing operation 338, data of the application/service is synchronized based on the synchronization interval (e.g., a currently set synchronization interval). For instance, processing operation 338 may comprise synchronizing data for a specific content portion (e.g., section of an electronic document, electronic notebook, etc.) between a locally stored version of the content and a version of the content maintained by the distributed data storage.

Flow of method 320 may proceed to decision operation 340, where it is determined whether a synchronization interval is to be changed. In examples where the synchronization interval is to be changed, flow of decision operation 340 branches YES and processing of method 320 returns back to processing operation 326 for processing that may re-evaluate the synchronization interval (e.g., generate a new classification prediction for the synchronization interval). In some alternative examples, current signal data collected and analyzed (e.g., in processing operation 326) may yield a determination that multiple user accounts are concurrently accessing a content portion during a user session (or multiple user sessions are occurring on the same content). This may occur even after an initial synchronization interval classification prediction is generated for a user session, as trained AI processing may be configured to continuously detect changes in context data. In such technical instances, a synchronization interval may be automatically set to a fastest possible synchronization interval. This may comprise either bypassing processing to generate synchronization interval classification prediction or having a synchronization prediction component automatically output a synchronization interval classification prediction that suggests a fastest possible synchronization interval to mitigate the risk of data loss during concurrent collaborative access to content.

In examples where the synchronization interval is not to be changed, flow of decision operation 340 branches NO and processing of method 320 ends/remains idle until subsequent processing is to commence.

FIG. 4 illustrates a computing system 401 suitable for implementing processing operations described herein related to management of a synchronization interval for synchronization of content between a client device and a distributed data storage, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be a client computing device that is communicating with computing resources of an application/service over a network connection. In other examples, computing system 401 may be a server-side computing device executing processing to improve efficiency between a client computing device and one or more distributed computing resources of a software platform. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute processing operations for execution of processing related to system diagrams of FIGS. 1A and 1B, process flow 200 (FIG. 2), and exemplary methods 300 (FIG. 3A) and 320 (FIG. 3B).

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more synchronization prediction components 406a as described herein. Processing of exemplary synchronization prediction components 406a may result in the execution of any processing operations related to generation of a synchronization interval classification prediction and management of a synchronization interval, including any processing operations described in the foregoing description. Software 405 may further comprise application/service component(s) 406b that provide applications/services as described in the foregoing description such as an application/service (e.g., notetaking application/service) that is utilizes to access content, where a locally stored version of the content may be synchronized with one or more versions of the content that are maintained by a distributed data storage (e.g., distributed data storage service utilized to support operation of applications/services of a software platform). Exemplary synchronization prediction components 406a may interface with application/service components 406b to generate synchronization interval classification predictions and manage a state of a synchronization interval.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including GUI rendering of content accessed through an application/service, notifications of synchronization of content, display of settings related to a synchronization interval including factors that may affect AI processing for generation of synchronization interval classification predictions, among other non-limiting examples. User interface system 409 comprises a graphical user interface that presents graphical user interface elements representative of any point in the processing described in the foregoing description including processing operations described in the description of any system diagrams, process flows, and methods described herein. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., receipt of different modalities of input, audio output) in conjunction with operation of exemplary applications/services (e.g., productivity applications/services) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
analyzing historical device usage data of a user account indicating prior access to content of an application or service through a plurality of client devices linked to the user account;
determining, based on a result of the analyzing of the historical device usage data of the user account, whether two or more of the plurality of client devices linked to the user account accessed the content over a predetermined time period and whether the two or more of the plurality of client devices modified the content during the predetermined time period;
generating a synchronization interval classification prediction for the user account based on a result of the determining, wherein generating the synchronization interval classification prediction comprises applying trained artificial intelligence processing configured to generate the synchronization interval classification prediction based on a correlation result of correlating data indicating whether the two or more of the plurality of client devices accessed the content during the predetermined time period with data indicating whether the two or more of the plurality of client devices modified the content during the predetermined time period, and wherein the synchronization interval classification prediction is usable to predict a synchronization interval for synchronizing the content with a distributed data storage associated with the application or service; and
transmitting the synchronization interval classification prediction to a synchronization component of the application or service that is usable to modify a synchronization interval.

2. The method of claim 1, further comprising: receiving a query, from the synchronization component, usable to modify the synchronization interval, requesting the synchronization interval classification prediction; and in response to receiving the query, applying a trained artificial intelligence processing configured to generate the synchronization interval classification prediction, wherein the trained artificial intelligence processing executes processing operations that comprise the analyzing, the determining, the generating and the transmitting.

3. The method of claim 1, wherein the synchronization interval classification prediction is a recommendation to adjust the synchronization interval to a shorter interval based on the result of the determining identifying that the two or more of the plurality of client devices linked to the user account accessed the content over the predetermined time period.

4. The method of claim 1, wherein the synchronization interval classification prediction is a recommendation to adjust the synchronization interval to a longer interval based on the result of the determining identifying that the two or more of the plurality of client devices did not access the content over the predetermined time period.

5. The method of claim 1, wherein the application or service is a notetaking application or service, and wherein the content is a section in a notebook of the notetaking application or service.

6. The method of claim 5, wherein the historical device usage data comprises metadata identifying the section in the notebook, and one or more entries providing: an identifier of a device of the plurality of client devices linked to the user account that were used to access the section, and a timestamp for access to the section by the device.

7. The method of claim 1, wherein the analyzing of the historical device usage data further comprises parsing the historical device usage data of the user account to determine whether any of the plurality of client devices modified the content during the predetermined time period, and wherein the determining whether the two or more of the plurality of client devices accessed the content comprises determining whether the two or more of the plurality of client devices modified the content during the predetermined time period.

8. A system comprising:
at least one processor; and
a memory, operatively connected with the at least one processor, storing computer-executable instructions that, when executed by the at least one processor, causes the at least one processor to execute a method that comprises:
analyzing historical device usage data of a user account indicating prior access to content of an application or service through a plurality of client devices linked to the user account;
determining, based on a result of the analyzing of the historical device usage data of the user account, whether two or more of the plurality of client devices linked to the user account accessed the content over a predetermined time period and whether the two or more of the plurality of client devices modified the content during the predetermined time period;
generating a synchronization interval classification prediction for the user account based on a result of the determining, wherein the generating the synchronization interval classification prediction comprises applying trained artificial intelligence processing configured to generate the synchronization interval classification prediction based on a correlation result of correlating data indicating whether the two or more of the plurality of client devices accessed the content during the predetermined time period with data indicating whether the two or more of the plurality of client devices modified the content during the predetermined time period, and wherein the synchronization interval classification prediction is usable to predict a synchronization interval for synchronizing the content with a distributed data storage associated with the application or service; and
transmitting the synchronization interval classification prediction to a synchronization component of the application or service that is usable to modify a synchronization interval.

9. The system of claim 8, wherein the method, executed by the at least one processor, further comprises: receiving a query from the synchronization component, usable to modify the synchronization interval, requesting the synchronization interval classification prediction; and in response to receiving the query, applying a trained artificial intelligence processing configured to generate the synchronization interval classification prediction, wherein the trained artificial intelligence processing executes processing operations that comprise the analyzing, the determining, the generating and the transmitting.

10. The system of claim 8, wherein the synchronization interval classification prediction is a recommendation to adjust the synchronization interval to a shorter interval based on the result of the determining identifying that the two or more of the plurality of client devices linked to the user account accessed the content over the predetermined time period.

11. The system of claim 8, wherein the synchronization interval classification prediction is a recommendation to adjust the synchronization interval to a longer interval based on the result of the determining identifying that the two or more of the plurality of client devices did not access the content over the predetermined time period.

12. The system of claim 8, wherein the application or service is a notetaking application or service, and wherein the content is a section in a notebook of the notetaking application or service.

13. The system of claim 12, wherein the historical device usage data comprises metadata identifying the section in the notebook, and one or more entries providing: an identifier of a device of the plurality of client devices linked to the user account that were used to access the section, and a timestamp for access to the section by the device.

14. The system of claim 8, wherein the analyzing of the historical device usage data further comprises parsing the historical device usage data of the user account to determine whether any of the plurality of client devices modified the content during the predetermined time period, and wherein the determining whether the two or more of the plurality of client devices accessed the content comprises determining whether the two or more of the plurality of client devices modified the content during the predetermined time period.

15. A method comprising:
analyzing historical device usage data of a user account indicating prior modification of content of an application or service through a plurality of client devices linked to the user account;
determining, based on a result of the analyzing of the historical device usage data of the user account, whether two or more of the plurality of client devices linked to the user account accessed the content over a predetermined time period and whether the two or more of the plurality of client devices linked to the user account modified the content over the predetermined time period;
generating a synchronization interval classification prediction for the user account based on a result of the determining, wherein generating the synchronization interval classification prediction comprises applying trained artificial intelligence processing configured to generate the synchronization interval classification prediction based on a correlation result of correlating data indicating whether the two or more of the plurality of client devices accessed the content during the predetermined time period with data indicating whether the two or more of the plurality of client devices modified the content during the predetermined time period, and wherein the synchronization interval classification prediction is usable to predict a synchronization interval for synchronizing the content with a distributed data storage associated with the application or service; and
modifying a synchronization interval based on the synchronization interval classification prediction.

16. The method of claim 15, further comprising: synchronizing a locally stored version of the content with a version of the content maintained by the distributed data storage based on the synchronization interval set based on the modifying.

17. The method of claim 15, further comprising: receiving a query requesting the synchronization interval classification prediction; and in response to receiving the query, applying a trained artificial intelligence processing configured to generate the synchronization interval classification prediction, and wherein the trained artificial intelligence processing executes processing operations that comprise the analyzing, the determining, the generating.

18. The method of claim 15, further comprising: transmitting the synchronization interval classification prediction to a synchronization component of the application or service, and wherein the synchronization component executes the modifying of the synchronization interval.

* * * * *